(12) United States Patent
Jung et al.

(10) Patent No.: US 11,738,984 B2
(45) Date of Patent: Aug. 29, 2023

(54) WATER PURIFIER

(71) Applicant: LG ELECTRONICS INC., Seoul (KR)

(72) Inventors: Jisun Jung, Seoul (KR); Jaegeun Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 499 days.

(21) Appl. No.: 17/043,122

(22) PCT Filed: Oct. 25, 2018

(86) PCT No.: PCT/KR2018/012714
§ 371 (c)(1),
(2) Date: Sep. 29, 2020

(87) PCT Pub. No.: WO2019/221344
PCT Pub. Date: Nov. 21, 2019

(65) Prior Publication Data
US 2021/0017009 A1 Jan. 21, 2021

(30) Foreign Application Priority Data

May 18, 2018 (KR) .................. 10-2018-0057315

(51) Int. Cl.
*B67D 1/00* (2006.01)
*B67D 1/08* (2006.01)
*C02F 1/00* (2023.01)

(52) U.S. Cl.
CPC ......... *B67D 1/0003* (2013.01); *B67D 1/0894* (2013.01); *C02F 1/00* (2013.01);
(Continued)

(58) Field of Classification Search
CPC ................ B67D 1/0003; B67D 1/0894; B67D 2210/0001; B67D 2210/00049;
(Continued)

(56) References Cited

U.S. PATENT DOCUMENTS

2008/0190132 A1 8/2008 Voglewede et al.
2015/0300729 A1* 10/2015 Seo ................... F25D 23/126
62/189

(Continued)

FOREIGN PATENT DOCUMENTS

KR 10-2002-0024098 A 3/2002
KR 10-2006-0107706 A 10/2006
(Continued)

OTHER PUBLICATIONS

International Search Report issued in PCT/KR2018/012714 (PCT/ISA/210), dated Feb. 14, 2019.

*Primary Examiner* — Donnell A Long
(74) *Attorney, Agent, or Firm* — Birch, Stewart, Kolasch & Birch, LLP (57) ABSTRACT

A water purifier includes a main body including a water supply pipe provided therein and a water chute connected to the main body to discharge drinking water. The water chute is capable of rotating about the main body in a left and right direction and has a length adjustable in a forward and backward direction and an upward and downward direction.

15 Claims, 9 Drawing Sheets

(52) U.S. Cl.
CPC ............... *B67D 2210/0001* (2013.01); *B67D 2210/00049* (2013.01); *B67D 2210/00062* (2013.01); *B67D 2210/00065* (2013.01); *C02F 2307/10* (2013.01)

(58) Field of Classification Search
CPC ........... B67D 2210/00062; B67D 2210/00065; B67D 1/0014; B67D 1/0001; C02F 1/00; C02F 2307/10
See application file for complete search history.

(56) References Cited

U.S. PATENT DOCUMENTS

| | | | |
|---|---|---|---|
| 2018/0194608 A1 | 7/2018 | Jeon et al. | |
| 2019/0060803 A1* | 2/2019 | Jeon | B01D 35/303 |

FOREIGN PATENT DOCUMENTS

| | | |
|---|---|---|
| KR | 10-0939310 B1 | 1/2010 |
| KR | 10-1818390 B1 | 1/2018 |

* cited by examiner

WATER PURIFIER

CROSS REFERENCE TO RELATED APPLICATIONS

This application is the National Phase of PCT International Application No. PCT/KR2018/012714, filed on Oct. 25, 2018, which claims priority under 35 U.S.C. 119(a) to Patent Application No. 10-2018-0057315, filed in the Republic of Korea on May 18, 2018, all of which are hereby expressly incorporated by reference into the present application.

TECHNICAL FIELD

The present invention relates to a water purifier.

BACKGROUND ART

A water purifier is a device for filtering out harmful elements such as foreign materials or heavy metals contained in water using physical and/or chemical methods.

The prior art described below discloses a purifier having a water outlet module capable of rotating in a left and right direction and a water purifier having a water outlet module capable of moving upward or downward.

However, according to the disclosed conventional water purifier, since the water outlet module can perform only one of left-and-right rotation and upward-and-downward movement, it is inconvenient to use the conventional water purifier.

That is, in the water purifier having the water outlet module capable of only rotating in the left and right direction, if the length of a water cup is larger than the height of a water outlet port, the water cup may collide against the water outlet module when the water outlet module rotates, thereby damaging the water cup or causing the water cup to fall down.

In addition, if a distance from the bottom of the water cup to the water outlet port is large, a portion of the discharged water may splash onto the bottom of the water cup and then spurt from the water cup.

In addition, in the water purifier having the water outlet module capable of only moving upward and downward, since the position of the water outlet module is fixed, if the water purifier is installed at the corner of a wall, it may be inconvenient to discharge water. For example, if the water purifier is installed at the corner of the wall, it may be inconvenient to store water in a container having a large capacity and a small water inlet. That is, when the water outlet port cannot be rotated in a direction separated from the wall surface, that is, toward the water inlet of the container, it may be inconvenient to use the water purifier according to the volume of the container or the size of the water inlet.

In addition, since the water outlet module moves upward or downward, the lowest point of the water outlet module is a point contacting the upper end of the container. Accordingly, the water outlet port of the water outlet module cannot move downward below the upper end of the container.

Further, in the structure in which the water outlet module moves upward or downward, a guide hole or a guide groove for guiding upward-and-downward movement of the water outlet module is formed in the front surface of the main body of the water purifier to extend in a vertical direction. As a result, foreign materials may be introduced into the main body of the water purifier through the guide hole or the guide groove.

Further, in order to prevent foreign materials from being introduced, a shield film for shielding the guide hole or the guide groove when the water outlet module moves upward or downward needs to be further provided.

In addition, in the structure in which the water outlet module moves upward or downward, the height of a portion where a water supply pipe in the main body of the water purifier and the inlet end of the water outlet module are connected should be adjustable. To this end, there is a design difficulty in that the length of the water supply pipe in the main body of the water purifier should be adjustable.

In addition, since the length of the water outlet module capable of moving in the left and right direction or the upward and downward direction cannot be adjusted in the forward and backward direction, if water is stored in a container having a large volume and a small neck portion, the water outlet port of the water outlet module cannot be accurately located at the inlet of the container and thus water is scattered when water is discharged or a user keeps the container tilted for a long time.

PRIOR ART DOCUMENT

Korean Patent Registration No. 10-1818390 (Jan. 8, 2018)

DISCLOSURE OF INVENTION

Technical Problem

An object of the present invention is to solve the above-described problems.

Solution to Problem

To achieve the above objects, there is provided a water purifier including a main body including a water supply pipe provided therein and a water chute connected to the main body to discharge drinking water, wherein the water chute is capable of rotating about the main body in a left and right direction and has a length adjustable in a forward and backward direction and an upward and downward direction.

Specifically, the water chute includes a discharge pipe unit having one end connected to the water supply pipe and having a length adjustable in a forward and backward direction and an upward and downward direction, a nozzle part connected to the other end of the discharge pipe unit and having a discharge port for discharging drinking water, and a chute case connected to the main body to accommodate the discharge pipe unit and the nozzle part and having a length adjustable in the forward and backward direction and the upward and downward direction along with the discharge pipe unit.

The nozzle part is inserted into and fixed to a nozzle hole formed in an end of the chute case.

Advantageous Effects of Invention

The water purifier according to the embodiment of the present invention including the above configuration can solve the problems of the conventional water purifier.

Specifically, the water chute for discharging water may be drawn out in a multistage manner in the forward and backward direction and the upward and downward direction and, at the same time, may be rotated in the left and right direction. Accordingly, it is possible to appropriately adjust the position of the outlet port according to the installation position of the water purifier or the shape or size of a used container.

More specifically, since the height of the outlet port can be appropriately adjusted, it is possible to minimize a phenomenon wherein some of discharged water spurts out of a container in a process of discharging water.

In addition, since only the water nozzle moves upward or downward without moving the water chute upward or downward in order to adjust the height of the outlet port, it is possible to increase convenience of operation. Specifically, since only the vertical portion of the water chute is drawn out in a multistage manner while the height of the horizontal portion of the water chute is maintained, the water nozzle part can be inserted into the container, thereby minimizing a phenomenon wherein water spurts out of the container when water is discharged.

In addition, since the nozzle part can move in the forward and backward direction, the nozzle part may be accurately located at the inlet of the container regardless of the volume of a container or the size of the neck portion of a container.

A user does not need to tilt a container in order to store water in a container having a large volume and a small inlet size.

In addition, separate power is not required for multistage drawing operation of the water chute and a user can grasp the water chute to move the water chute in the forward and backward direction or the upward and downward direction.

MODE FOR THE INVENTION

Hereinafter, the structure and function of a water purifier according to an embodiment of the present invention will be described in detail with reference to the drawings.

Figure 1:
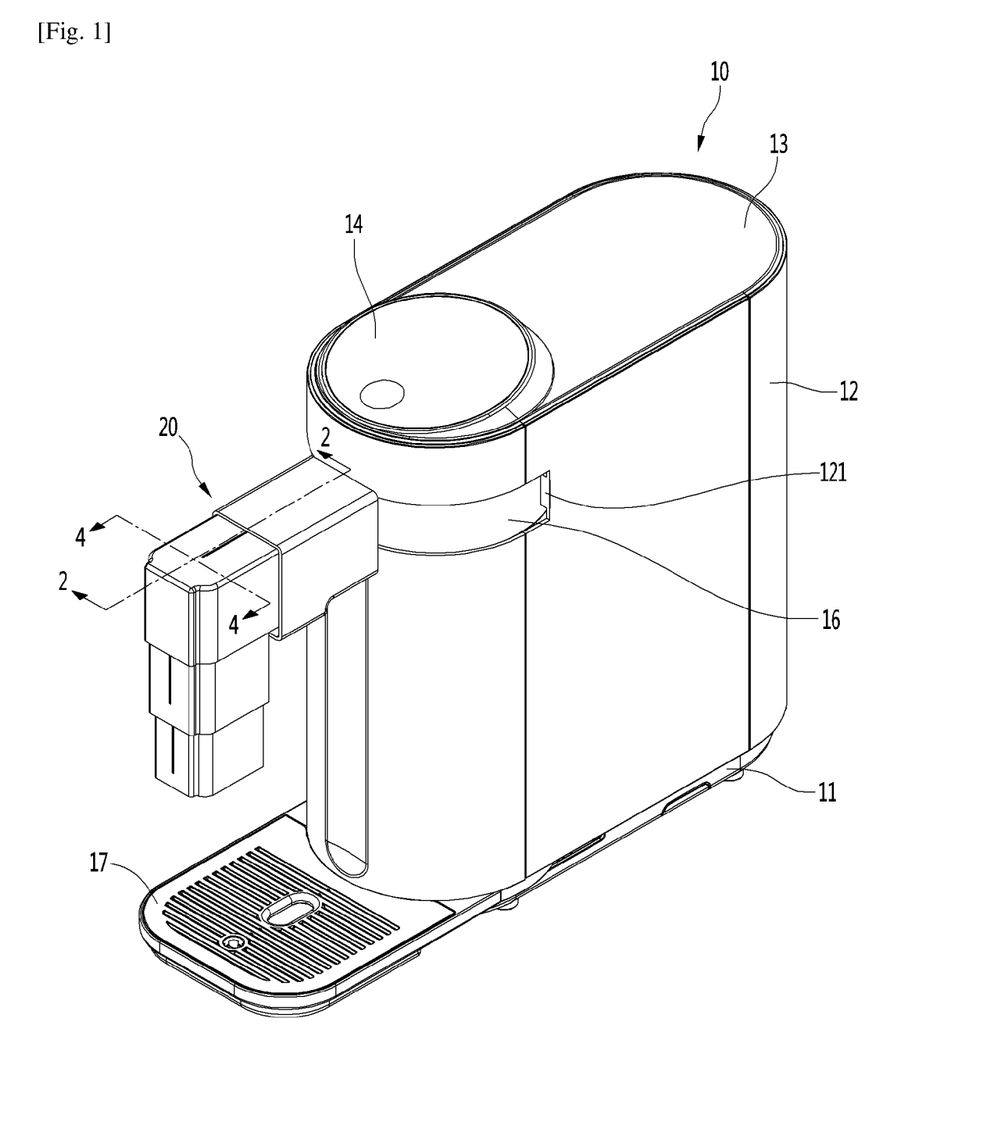
FIG. 1 is a front perspective view of a water purifier according to an embodiment of the present invention.

FIG. 1 is a front perspective view of a water purifier according to an embodiment of the present invention.

Referring to FIG. 1, the water purifier 10 according to the embodiment of the present invention may include a base 11 forming a bottom thereof, a housing 12 placed on an upper edge of the base 11, a cover 13 covering an opened upper surface of the housing 12, a control panel 14 formed on an upper surface of the cover 13, and a water chute 20 protruding from an outer circumferential surface of the housing 12.

More specifically, a portion, to which the water chute 20 is coupled, may be defined as a front surface of the water purifier 10 and an opposite surface of the portion defined as the front surface may be defined as a rear surface of the water purifier. A portion of the water purifier 10 excluding the water chute 20 may be defined as a main body. Therefore, it can be said that means for cooling or heating supplied water, a water supply pipe and various electric parts may be accommodated in the main body.

In addition, the control panel 14 may be formed at a position close to a front end of the water purifier 10 or may be formed at a position close to an upper central portion or rear end of the water purifier 10 according to design conditions. In addition, the control panel 14 may be inclined such that the height thereof is increased in the backward direction, thereby being easily recognized by a user standing in front of the water chute 20.

Specifically, the control panel 14 may include a panel body 141 having a rear end protruding from the upper surface of the water purifier 10 to be higher than a front end thereof and a panel cover 142 covering the upper surface of the panel body 141. In addition, holes or grooves in which a plurality of buttons are installed may be formed in the panel body 141, and the buttons may be installed in the holes or grooves.

In addition, the water chute 20 may be installed to be rotated about the front end of the water purifier 10 by 90 degrees in the left and right direction, but the rotation angle is not limited thereto.

In addition, a rotation guide 16 having a circular band shape may be installed on the rear end of the water chute 20 such that the water chute 20 may rotate. The water chute 20 and the rotation guide 16 may be integrally injection-molded or may be formed as separate parts and coupled by a fastening member.

In addition, a guide hole 121 for guiding rotation of the water chute 20 may be formed in the front surface of the housing 12, and the water chute 20 may rotate to the left or right along the guide hole 121.

In addition, a tray 17 is installed on the front end of the base 11, and the water chute 20 may be located right above the tray 17. Accordingly, a user may place a container to be filled with water on the upper surface of the tray 17 and then press a water discharge button to discharge water from the water chute 20.

In addition, the tray 17 may be provided to rotate to the left or right by an angle corresponding to the rotation angle of the water chute 20. The tray 17 and the water chute 20 may be connected by a connection member (not shown), such that the tray 17 rotates when the water chute 20 rotates.

For example, the rotation center of the water chute 20 and the rotation center of the tray 17 are connected by a connection bar, such that the water chute 20 and the tray 17 coaxially rotate.

In another example, the tray 17 and the water chute 20 may be designed to independently rotate.

Hereinafter, the structure and function of the water chute 20 will be described in detail with reference to the drawings.

Figure 2:
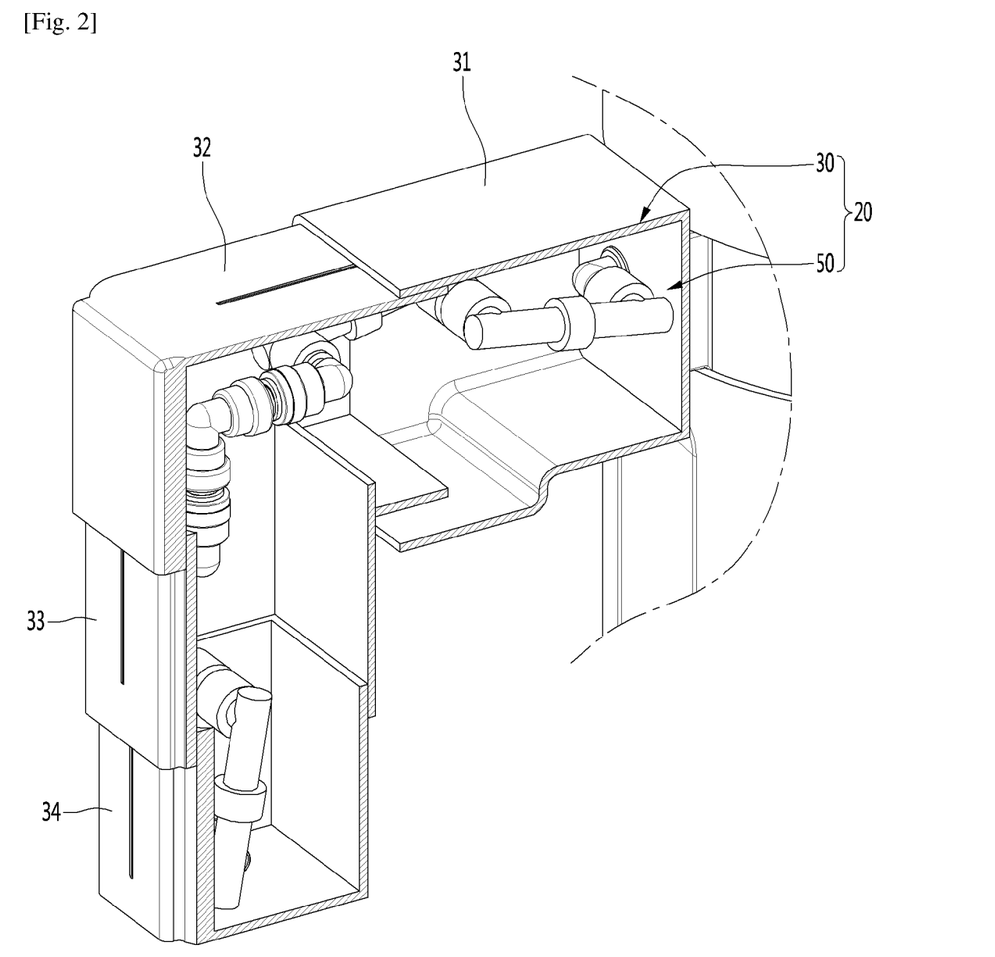
FIG. 2 is a cutaway perspective view cut along line 2-2 of FIG. 1.

FIG. 2 is a cutaway perspective view cut along line 2-2 of FIG. 1.

Referring to FIG. 2, the water chute 20 according to the embodiment of the present invention includes a chute case 30 and a discharge pipe unit 50 accommodated in the chute case 30.

Specifically, the discharge pipe unit 50 is connected to a discharge end of a water supply pipe provided inside the housing 12 and extends to the outside of the housing 12 through the rotation guide 16. In addition, the discharge pipe unit 50 has a structure in which a plurality of pipes are connected so as to be rotated relative to each other and the lengths thereof are adjustable in a forward and backward direction and an upward and downward direction. The structure of the discharge pipe unit 50 will be described in detail below with reference to the drawings.

Specifically, the chute case 30 is designed to surround and protect the discharge pipe unit 50 and to be drawn out in the forward and backward direction and in the upward and downward direction. Each of cases configuring the chute case 30 is formed in a hexahedral shape to have a rectangular cross-sectional shape without being limited thereto and may be formed in a cylindrical shape.

More specifically, the chute case 30 may include a fixed case 31 fixed to the rotation guide 16 and one or a plurality of horizontal drawable cases 32 movably coupled to the fixed case 31. The fixed case 31 and one or the plurality of horizontal drawable cases 32 may be defined as a horizontal case.

The rear end of the fixed case 31 may be coupled to the front surface of the rotation guide 16 or may be injection-molded integrally with the rotation guide 16. In addition, the front surface of the fixed case 31 is opened such that the horizontal drawable case 32 is inserted thereinto.

Although one horizontal drawable case 32 is shown as being coupled to the fixed case 31, two or more horizontal drawable cases 32 may be coupled in a multistage manner, depending on a draw-out distance thereof. In addition, the horizontal drawable case 32 may be designed to be slidably inserted into the fixed case 31 or to be slidably drawn out from the fixed case 31 forward.

A guide hole 321 (see FIG. 5) is formed in the bottom surface of the foremost horizontal drawable case 32 such that the below-described horizontal drawable case is inserted thereinto.

Specifically, the chute case 30 may include one or a plurality of vertical drawable cases slidably and movably coupled to the foremost horizontal drawable case 32 in a vertical direction. For example, the plurality of vertical drawable cases may include a first vertical drawable case 33 drawn out from the bottom surface of the horizontal drawable case 32 downward and a second vertical drawable case 34 drawn out from the bottom surface of the first vertical drawable case 33 downward. The plurality of vertical drawable cases 33 and 34 may be defined as a vertical case.

According to such a structure, the user pushes or pulls the horizontal drawable case 32 to adjust the forward draw-out distance of the chute case 30 or pushes up or down the vertical drawable cases 33 and 34 to adjust the downward draw-out distance of the chute case 30.

Hereinafter, the coupling structure of the drawable cases will be described in detail with reference to the drawings.

Figure 3:
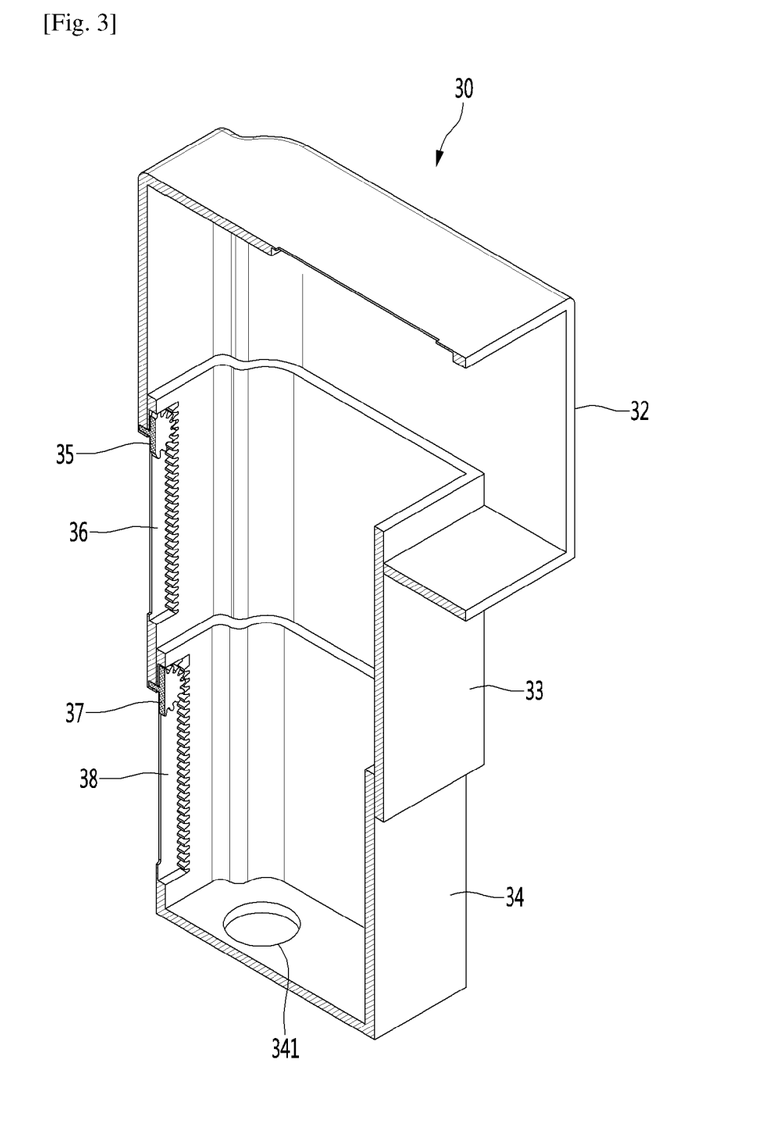
FIG. 3 is a cutaway perspective view of a water chute cut along line 2-2 of FIG. 1 when viewed from the back.
Figure 4:
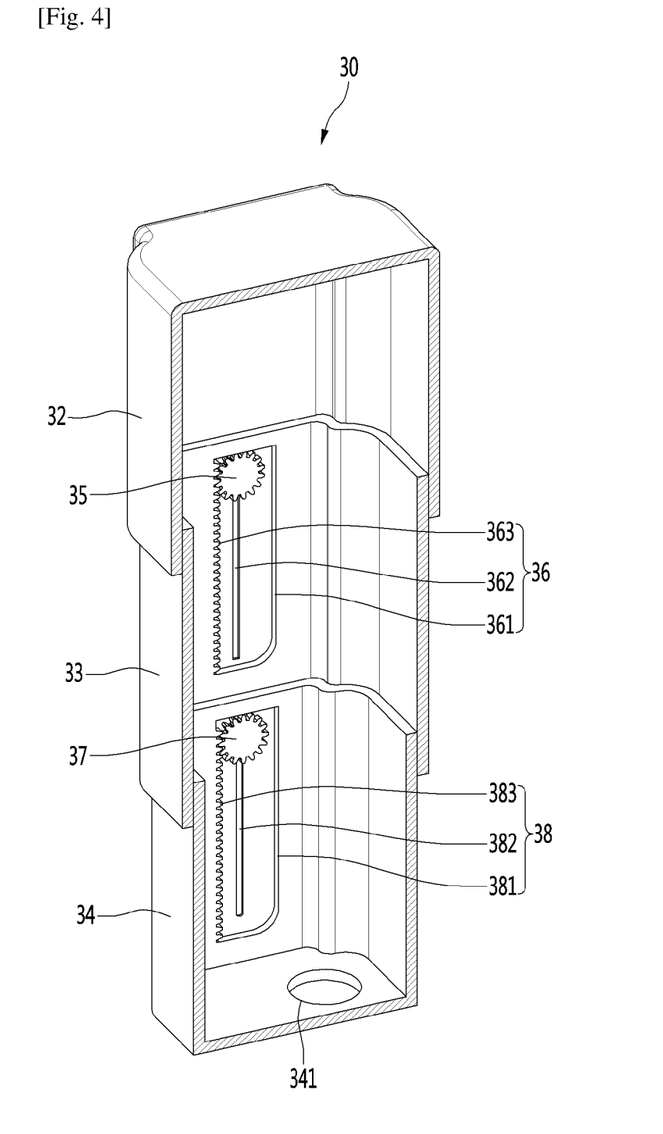
FIG. 4 is a cutaway perspective view of a water chute cut along line 4-4 of FIG. 1.
Figure 5:
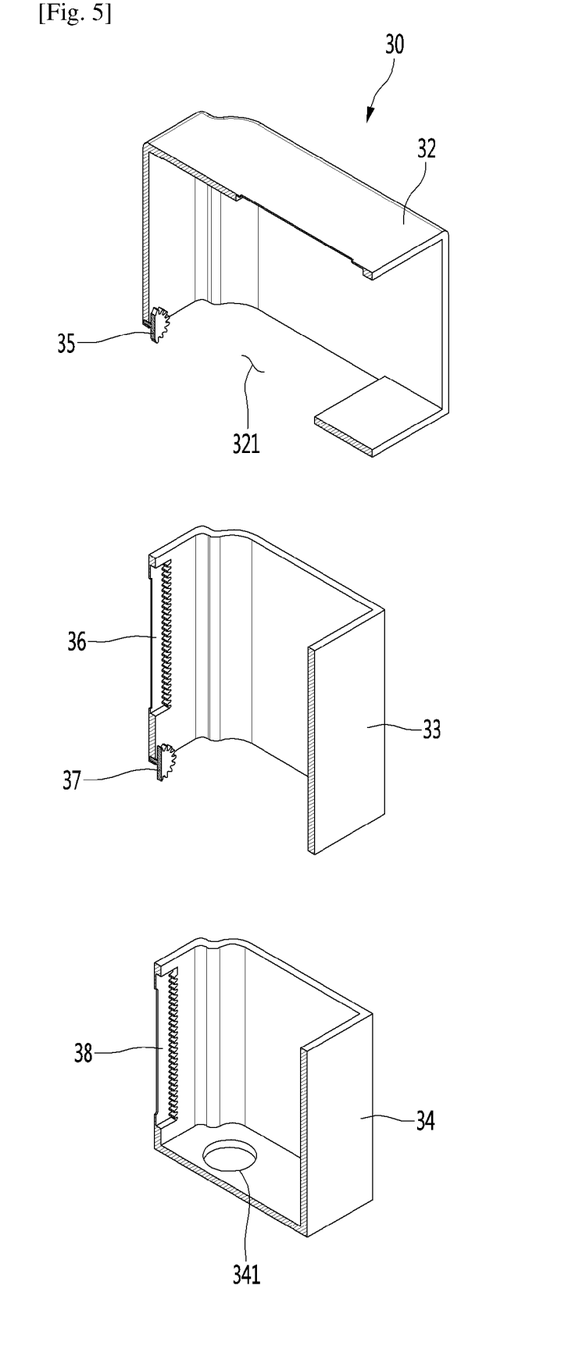
FIG. 5 is an exploded view of a chute case configuring the water chute shown in FIG. 4.
Figure 6:
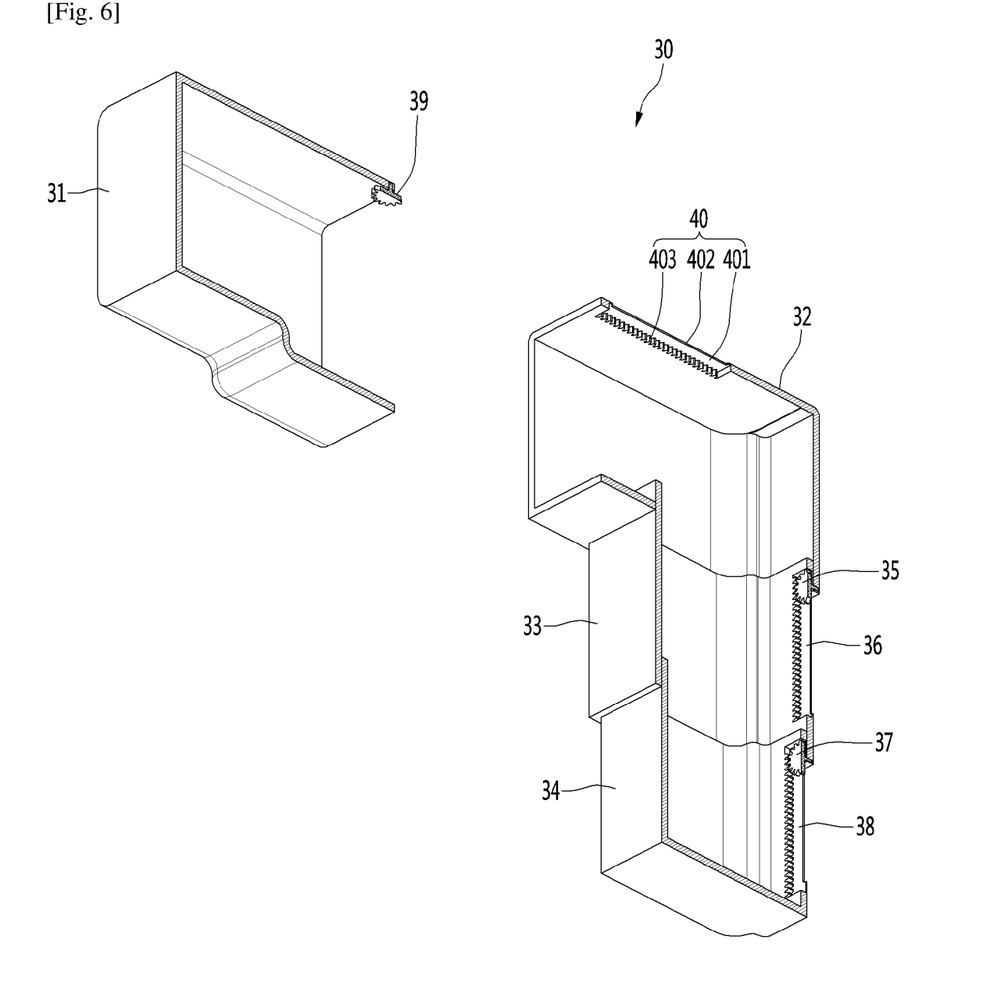
FIG. 6 is a cutaway perspective view of the water chute cut along line 2-2 of FIG. 1 when viewed from the bottom.

FIG. 3 is a cutaway perspective view of a water chute cut along line 2-2 of FIG. 1 when viewed from the back, FIG. 4 is a cutaway perspective view of a water chute cut along line 4-4 of FIG. 1, FIG. 5 is an exploded view of a chute case configuring the water chute shown in FIG. 4, and FIG. 6 is a cutaway perspective view of the water chute cut along line 2-2 of FIG. 1 when viewed from the bottom.

Referring to FIGS. 3 to 5, the second vertical drawable case 34 and the first vertical drawable case 33, and the first vertical drawable case 33 and the horizontal drawable case 32 may be coupled to be moved relative to each other by a rack/pinion structure.

Specifically, the rack/pinion structure may be provided on any one of the surfaces where the horizontal drawable case 32 and the vertical drawable case are in contact with each other. Specifically, a pinion may be installed in a drawable case which is kept fixed and a guide for guiding relative movement of the pinion may be formed in a movable drawable case.

For example, a pinion 35 is rotatably coupled to an inner surface of the horizontal drawable case 32 and a pinion guide 36 may be formed on the inner surface of the first vertical drawable case 33.

Specifically, the pinion 35 may be installed at a position close to the lower end of the horizontal drawable case 32 such that the first vertical drawable case 33 is maximally drawn out.

In addition, the pinion guide 36 for guiding relative movement of the pinion 35 may be formed on the inner surface of the first vertical drawable case 33 corresponding to the position of the pinion 35. The pinion 35 and the pinion guide 36 may be formed on one side of each of the cases as shown in the figure or a plurality of pinions 35 and pinion guides 36 may be formed on opposite sides of the cases. For example, the pinions and the pinion guides may be formed on the front and rear surfaces or left and right surfaces of the drawable cases.

The pinion guide 36 may include a pinion accommodation part 361 recessed from the rear surface of the first vertical drawable case 33 by a depth corresponding to the thickness of the pinion 35, a rack gear part 363 formed on a side surface of the pinion accommodation part 36, and a guide slit 362 formed at the center of the pinion accommodation part 361.

Specifically, the pinion accommodation part 361 is formed in the inner surface of the first vertical drawable case 33 so as not to be exposed when the first vertical drawable case 33 is drawn out, for aesthetic effect.

In addition, the pinon accommodation part 361 extends by a predetermined length in the longitudinal direction of the first vertical drawable case 33. As the upper end of the pinion accommodation part 361 becomes closer to the upper end of the first vertical drawable case 33, the draw-out length of the first vertical drawable case 33 is maximized, and, as the lower end of the pinion accommodation part 361 becomes closer to the lower end of the first vertical drawable case 33, external exposure is minimized when the first vertical drawable case 33 is drawn in.

In addition, the rack gear part 363 may be formed on any one of the left and right side surfaces of the pinion accommodation part 361. In another method, the width of the pinion accommodation part 361 may be equal to the diameter of the pinion 35 and the rack gear parts 363 may be respectively formed on the left and right side surfaces of the pinion accommodation part 361.

In addition, the guide slit 362 is defined as a path along which the rotation shaft of the pinion 35 moves when the first vertical drawable case 33 moves in the upward and downward direction. Specifically, the rotation shaft of the pinion 35 is inserted into the inner surface of the horizontal drawable case 32 through the guide slit 362. In addition, frictional force is generated between the rotation shaft of the pinion 35 and the horizontal drawable case 32, thereby preventing the first vertical drawable case 33 from falling down due to the weight thereof.

It is necessary to limit rotation of the pinion 35 in order to prevent free fall of the first vertical drawable case due to the weight thereof. That is, it is necessary to apply force for restricting the rotation shaft of the pinion 35 such that the pinion 35 rotates only by applying rotational force greater than a set value. As one method, a friction member such as a friction ring or a friction pad may be attached to the outer circumferential surface of the rotation shaft so as to apply frictional force to the rotation shaft of the pinion 35.

A pinion 37 may be installed at a lower end of the first vertical drawable case 33, that is, a position downwardly spaced apart from the lower end of the pinion accommodation part 361 by a predetermined distance, and a pinion guide 38 may be formed on the inner surface of the second vertical drawable case 34. In addition, the pinion guide 38 may include a pinion accommodation part 381, a guide slit 382 and a rack gear part 383.

In addition, a nozzle hole 341 is formed in the bottom of the second vertical drawable case 34 and a nozzle part 61 of the discharge pipe unit 50 is inserted into and fixed to the nozzle hole 341. The nozzle part 61 moves in the upward and downward direction along with the second vertical drawable case 34.

Referring to FIG. 6, a pinion 39 is installed on the inner surface of the fixed case 31, and a pinion guide 40 is formed on the inner surface of the horizontal drawable case 32 connected to the fixed case 31, such that the horizontal drawable case 32 is drawn out from the fixed case 31 or is drawn into the fixed case 31. Of course, the pinion 40 may include a pinion accommodation part 401, a guide slit 402 and a rack guide part 403.

In summary, a pinion and a pinion guide may be formed on overlapping portions of the plurality of cases such that the plurality of cases is drawn out or in in a multistage manner.

Figure 7:
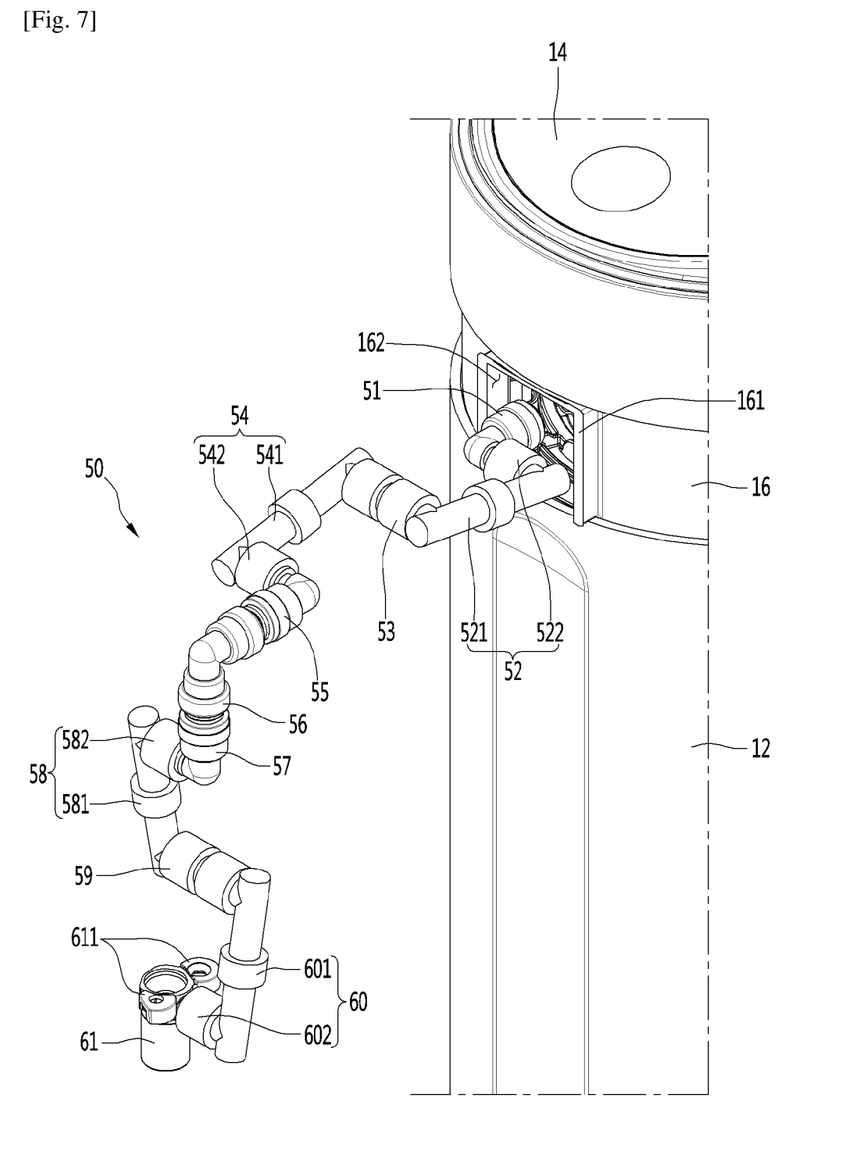
FIG. 7 is a perspective view showing a discharge pipe unit configuring a water chute according to an embodiment of the present invention.

FIG. 7 is a perspective view showing a discharge pipe unit configuring a water chute according to an embodiment of the present invention.

Referring to FIG. 7, a through-hole 162 may be formed in the front surface of the rotation guide 16, and the water supply pipe provided inside the housing 12 and the inlet end of the discharge pipe unit 50 may be connected through the through-hole 162. A guide rib 161 extends on the edge of the through-hole 162 and the chute case 30 may be connected to the guide rib 161.

Specifically, the discharge pipe unit 50 may include a fixed pipe 51 having one end fixed to the discharge port of the water supply pipe, a plurality of extension pipes connected to the fixed pipe 51 and having an "L" shape, a plurality of connection pipes connecting the plurality of extension pipes, a plurality of elbows connecting the plurality of extension pipes, and the nozzle part 61 fixed to the lower end of the chute case 30 to discharge drinking water. The components excluding the nozzle part 61 may be defined as the discharge pipe unit 50 and the nozzle part 61 may be described as being connected to the end of the discharge pipe unit 50.

The plurality of extension pipes may include first to fourth extension pipes 52, 54, 58 and 60. In addition, the plurality of connection pipes may include first and second connection pipes 53 and 59.

The first extension pipe 52 includes an extension portion 521 extending by a predetermined length and a bent portion 522 bent and extending from one end of the extension portion 521. The bent portion 522 is rotatably connected to the other end of the fixed pipe 51.

In addition, one end of the first connection pipe 53 is rotatably connected to the other end of the extension portion 521 and is perpendicular to the extension portion 521.

In addition, the second extension pipe 54 includes an extension portion 541 and a bent portion 542, similarly to the first extension pipe 52. In addition, the other end of the first connection pipe 53 is rotatably connected to the end of the extension portion 541 in a direction perpendicular to the extension portion.

In addition, the plurality of elbows may include first to third elbows 55, 56 and 57 and the number of elbows is not limited thereto.

One end of the first elbow 55 is connected to the bent portion 542 of the second extension pipe 54 and the other end thereof is connected to one end of the second elbow 56. The other end of the second elbow 56 is connected to one end of the third elbow 57 and the other end of the third elbow 57 is rotatably connected to the bent portion 582 of the third extension pipe 58.

One end of the second connection pipe 59 is rotatably connected to the extension portion 581 of the third extension pipe 58. The other end of the second connection pipe 59 is rotatably connected to the extension portion 601 of the fourth extension pipe 60. In addition, the nozzle part 61 is fixed and coupled to the bent portion 602 of the fourth extension pipe 60, and the nozzle part 61 is fixed to the last vertical drawable case.

In the present embodiment, the last vertical drawable case means the second vertical drawable case 34. The discharge port of the nozzle part 61 is exposed to the outside through the nozzle hole 341 formed in the bottom of the second vertical drawable case 34.

In the present embodiment, one or a plurality of fastening flanges 611 may be formed on the upper edge of the nozzle part 61 and fastening members passing through the fastening flanges 611 may be inserted into the bottom of the second vertical drawable case 34, such that the nozzle part 61 is fixed to the second vertical drawable case 34.

A combination of the first and second extension pipes 52 and 54 and the first connection pipe 53 may be defined as a horizontal length adjuster, a combination of the third and fourth extension pipes 58 and 60 and the second connection pipe 59 may be defined as a vertical length adjuster, and a combination of the first to third elbows 55, 56 and 57 may be defined as a connector.

Hereinafter, a method of adjusting the length of the discharge pipe unit 50 in the forward and backward direction and in the upward and downward direction will be described in detail with reference to the drawings.

Figure 8:
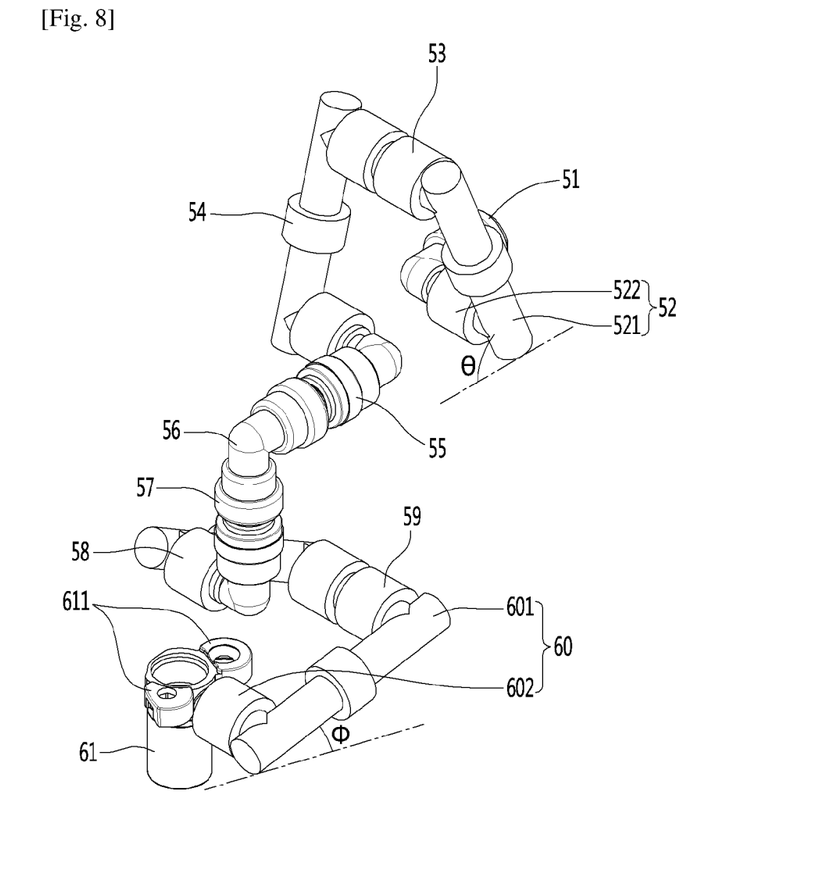
FIG. 8 is a perspective view showing a state of deceasing the length of a discharge pipe unit according to an embodiment of the present invention.
Figure 9:
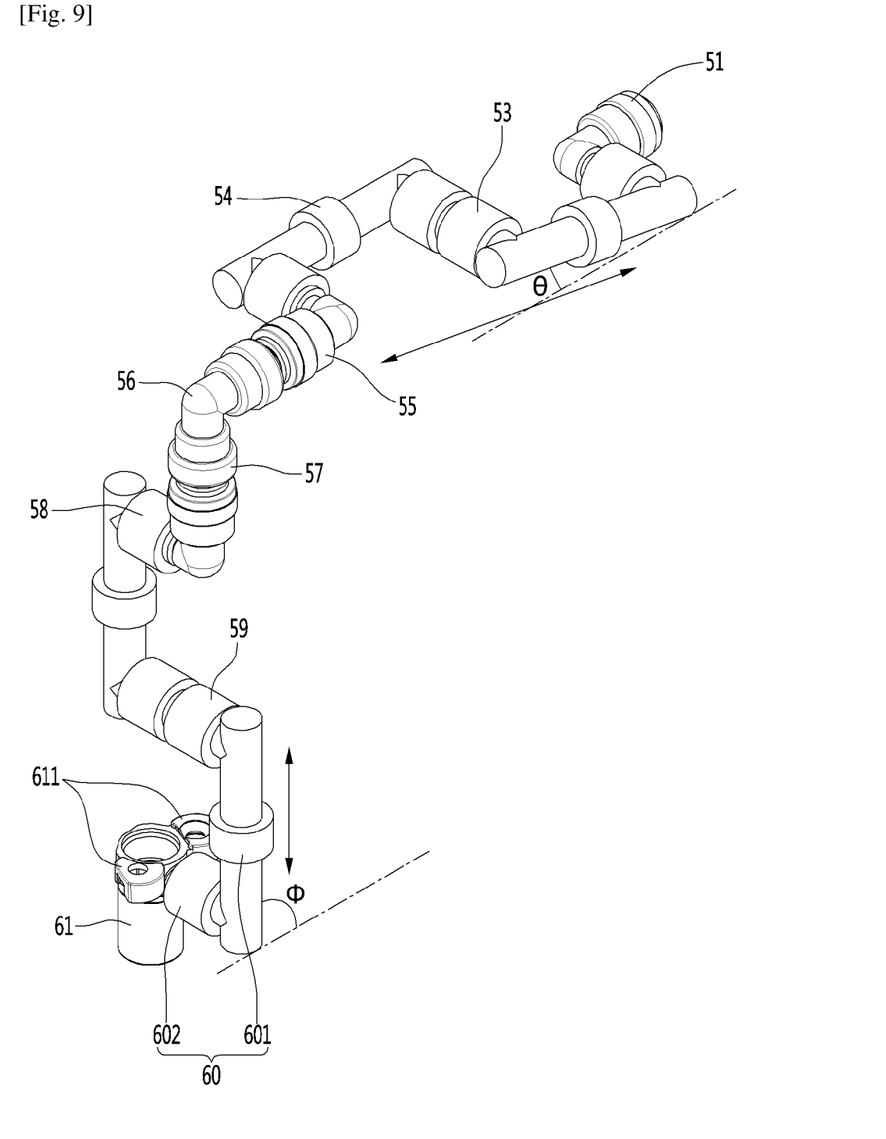
FIG. 9 is a perspective view showing a state of increasing the length of the discharge pipe unit.

FIG. 8 is a perspective view showing a state of deceasing the length of a discharge pipe unit according to an embodiment of the present invention, and FIG. 9 is a perspective view showing a state of increasing the length of the discharge pipe unit.

Referring to FIGS. 8 and 9, when the horizontal drawable case 32 moves in the forward and backward direction, the length of the discharge pipe unit 50 in the forward and backward direction is changed, and, when the vertical drawable cases 33 and 34 move in the upward and downward direction, the length of the discharge pipe unit 50 in the upward and downward direction is changed.

The first to third elbows 55, 56 and 57 move along with the horizontal drawable case 32 only in the forward and backward direction while maintaining the same shape regardless of movement of the drawable cases.

For example, when the horizontal drawable case 32 is pushed into the fixed case 31, as shown in FIG. 8, the bent portion 522 of the first extension pipe 52 rotates about the fixed pipe 51. At this time, an angle q between the extension portion 521 of the first extension pipe 52 and the horizontal plane increases and the first extension pipe 52 horizontally moves upward.

That is, the extension portion 521 of the first extension pipe 52 and the extension portion 541 of the second extension pipe 54 rotate about the first connection pipe 53 in opposite directions. The bent portion 522 of the first extension pipe 52 and the bent portion 542 of the second extension pipe 54 become closer to each other, and the combination of the elbows 55, 56 and 57 horizontally moves backward.

In contrast, when the horizontal drawable case 32 is pulled forward, the bent portion 522 of the first extension pipe 52 and the bent portion 542 of the second extension pipe 54 are separated from each other and the first connection pipe 52 moves downward.

The angle q between the extension portion 521 or 541 and the vertical plane is greater than 0 degrees and is less than 90 degrees and the vertical length of the fixed case 31 or the horizontal drawable case 32 is designed such that the fixed case 31 or the horizontal drawable case 32 does not interfere with the first connection pipe 53.

In addition, when the extension portions 521 and 541 are flush with the horizontal plane in a state in which the horizontal drawable case 32 is maximally drawn out, operation of pushing the horizontal drawable case 32 may not be performed smoothly. Accordingly, the angle q when the horizontal drawable case 32 is maximally drawn out may be set to be greater than 0. That is, in a state in which the horizontal drawable case 32 is maximally drawn out, the extension portions 521 and 541 may be inclined upwardly or downwardly from the horizontal plane by a predetermined angle.

When the horizontal drawable case 32 is pushed in, the first and second extension pipes 52 and 54 may be designed to rotate in a direction in which the first connection pipe 53 moves downward.

In the same manner, when the second vertical drawable case 34 or the first vertical drawable case 33 is pull down or push up, the extension portions 581 and 601 of the third and fourth extension pipes 58 and 60 rotate about the second connection pipe 59 in opposite directions. Then, the second connection pipe 59 moves forward or backward to increase or decrease the height of the nozzle part 61.

At this time, similarly, in a state in which the vertical drawable cases 34 and 35 are maximally drawn out, an angle f between the extension portions 581 and 601 of the third and fourth extension pipes 58 and 60 and the horizontal plane may be designed to be less than 90 degrees.

In other words, when the extension 581 of the third extension pipe 58 and the extension portion 601 of the fourth extension pipe 60 are flush with the vertical plane in a state in which the vertical drawable cases are maximally drawn out, operation of pushing up the vertical drawable case again may not be performed smoothly. Accordingly, the angle f between the extension portions 581 and 601 and the horizontal plane may be designed to be less than 90 degrees.

In other words, in a state in which the vertical drawing case is maximally drawn out, the extension portions 581 and 601 may be designed to be inclined forwardly or backwardly from the vertical plane by a predetermined angle.

When the nozzle part 61 moves upward or downward, the combination of the elbows 55, 56 and 57 is kept fixed without moving.

According to the above-described structure of the water chute 20, since the outlet end of the nozzle part 61 may simultaneously move in the forward and backward direction, the upward and downward direction and the left and right direction, the position of the nozzle part 61 may be freely adjusted according to the size of a container. If the area of the inlet of the container is greater than the cross-sectional size of the second vertical drawable case 34, the nozzle part 61 may be inserted into the container, thereby minimizing a phenomenon wherein water spurts out of the container when water is discharged.

In addition, since the water chute 20 does not need to move upward or downward in order to adjust the height of the nozzle part 61, it is not necessary to change the height of the portion where the fixed pipe 52 and the water supply pipe in the housing 12 are connected. Further, since a cutout portion for guiding upward or downward movement of the water chute 20 does not need to be formed in the front surface of the housing 12, it is not necessary to install a shielding film for preventing foreign materials from being introduced into the housing 12.

The invention claimed is:

1. A water purifier comprising:
   a main body including a water supply pipe provided therein; and
   a water chute connected to the main body to discharge drinking water,
   wherein the water chute includes:
   a discharge pipe unit having one end connected to the water supply pipe and having a length adjustable in a forward and backward direction and an upward and downward direction;
   a nozzle part connected to the other end of the discharge pipe unit and having a discharge port for discharging drinking water; and
   a chute case connected to the main body to accommodate the discharge pipe unit and the nozzle part and having a length adjustable in the forward and backward direction and the upward and downward direction along with the discharge pipe unit,
   wherein the nozzle part is inserted into and fixed to a nozzle hole formed in an end of the chute case.

2. The water purifier of claim 1, further comprising a rotation guide rotatably coupled to the main body in a left and right direction, wherein the water chute is connected to the rotation guide.

3. The water purifier of claim 2, wherein the chute case includes:
   a horizontal case drawn out in a multistage manner in the forward and backward direction to adjust a horizontal length thereof; and
   a vertical case connected to the horizontal case and drawn out in a multistage manner in the upward and downward direction to adjust a vertical length thereof.

4. The water purifier of claim 3, wherein the horizontal case includes:
   a fixed case fixed to the rotation guide and extending forward by a predetermined length; and
   one or a plurality of horizontal drawable case slidably connected to the fixed case.

5. The water purifier of claim 4, wherein the vertical case includes:
   a first vertical drawable case movably connected to the horizontal case in the upward and downward direction; and
   a second vertical drawable case movably connected to the first vertical drawable case in the upward and downward direction.

6. The water purifier of claim 5,
   wherein a pinion and a pinion guide coupled with the pinion are formed in portions where a plurality of cases configuring the chute case overlap, wherein the pinion is mounted on an inner surface of any one of two overlapping cases, and wherein the pinion guide is formed on an inner surface of the other of the two overlapping cases, the other of two overlapping cases configured to move relative to the one of two overlapping cases.

7. The water purifier of claim 6, wherein the pinion guide includes:

a pinion accommodation part extending by a predetermined width and length to accommodate the pinion;

a rack gear part formed on one of a left side surface a right side surface of the pinion accommodation part to be engaged with the pinion; and a guide slit formed in the pinion accommodation part by a predetermined length to allow a rotation shaft of the pinion to pass therethrough.

8. The water purifier of claim 2, wherein the discharge pipe unit includes:

a fixed pipe connected to an end of the water supply pipe;

a horizontal length adjuster rotatably connected to the fixed pipe to adjust a position of the nozzle part in the forward and backward direction;

a vertical length adjuster configured to adjust the position of the nozzle part in the upward and downward direction; and a connector connecting the horizontal length adjuster and the vertical length adjuster.

9. The water purifier of claim 8, wherein the horizontal length adjuster includes:

a first extension pipe having one end connected to the fixed pipe;

a first connection pipe having one end rotatably connected to the other end of the first extension pipe and extending in a direction perpendicular to the first extension pipe; and a second extension pipe having one end rotatably connected to the other end of the first connection pipe and extending in a direction perpendicular to the first connection pipe, and wherein the other end of the second extension pipe is rotatably connected to one end of the connector.

10. The water purifier of claim 9, wherein the position of the nozzle part in the forward and backward direction is adjusted in such a manner that the first extension pipe and the second extension pipe rotate in opposite directions about the first connection pipe, and the first connection pipe horizontally moves upward or downward.

11. The water purifier of claim 9, wherein the vertical length adjuster includes:

a third extension pipe having one end rotatably connected to the other end of the connector;

a second connection pipe having one end rotatably connected to the other end of the third extension pipe and extending in a direction perpendicular to the third extension pipe; and a fourth extension pipe having one end rotatably connected to the other end of the second connection pipe and extending in a direction perpendicular to the second connection pipe, and wherein the other end of the fourth extension pipe is rotatably connected to the nozzle part.

12. The water purifier of claim 11, wherein the position of the nozzle part in the upward and downward direction is adjusted in such a manner that the third extension pipe and the fourth extension pipe rotate in opposite directions about the second connection pipe, and the second connection pipe horizontally moves forward or backward.

13. The water purifier of claim 11, wherein the connector includes:

a first elbow connected to the second extension pipe;

a third elbow connected to the third extension pipe; and a second elbow connecting the first elbow with the third elbow.

14. The water purifier of claim 13, wherein the connector moves forward or backward during operation of the horizontal length adjuster and stops during operation of the vertical length adjuster.

15. The water purifier of claim 11, wherein the first and second extension pipes are inclined from a horizontal plane upward or downward by a predetermined angle in a state where the horizontal case maximally extends forward from the main body, and wherein the third and fourth extension pipes are inclined from a vertical plane forward or backward by a predetermined angle in a state where the vertical case maximally extends downward.

* * * * *